United States Patent [19]

Korba

[11] Patent Number: 4,631,702

[45] Date of Patent: Dec. 23, 1986

[54] COMPUTER SPEED CONTROL

[75] Inventor: Larry Korba, Ottawa, Canada

[73] Assignee: Canadian Patents and Deveopment Limited—Société Canadienne des Brevets et d'Exploitation Limitée, Ottawa, Canada

[21] Appl. No.: 584,497

[22] Filed: Feb. 28, 1984

[51] Int. Cl.⁴ ............................................. G06F 15/00
[52] U.S. Cl. .................................................... 364/900
[58] Field of Search ... 364/200 MS File, 900 MS File

[56] References Cited

U.S. PATENT DOCUMENTS

| | | | |
|---|---|---|---|
| 3,868,647 | 2/1975 | Zandveld | 364/900 |
| 3,999,169 | 12/1976 | Perschy | 364/900 |
| 4,072,852 | 2/1978 | Hogan et al. | 364/200 |
| 4,128,892 | 12/1978 | Vasa | 364/900 |
| 4,137,563 | 1/1979 | Tsunoda | 364/200 |
| 4,168,526 | 9/1979 | Auer, Jr. et al. | 364/900 |
| 4,231,104 | 10/1980 | St. Clair | 364/900 |
| 4,381,552 | 4/1983 | Nocilini et al. | 364/900 |
| 4,463,443 | 7/1984 | Frankel et al. | 364/900 |
| 4,485,457 | 11/1984 | Balaska et al. | 364/900 |
| 4,545,030 | 10/1985 | Kitchin | 364/900 |

*Primary Examiner*—James D. Thomas
*Assistant Examiner*—Thomas C. Lee
*Attorney, Agent, or Firm*—John A. Baker

[57] ABSTRACT

The present invention relates to a slow down circuit for use with a digital computer having a microprocessor ready line, an address bus and a data bus. The slow down circuit is comprised of an address decode logic unit for producing an inhibit signal when predetermined bit patterns appear on the address bus. The predetermined bit patterns represent special computer functions which require the computer to operate at normal speed. A slow down signal generator is connected to the address bus and the data bus for generating a bi-level signal. A combiner is connected to the address decode logic unit and the slow down signal generator for combining the inhibit signal and the bi-level signal to produce a control signal. The control signal has a first and a second logic level. When the control signal is at the first logic level the computer operates at normal speed. In the absence of a special function the control signal alternately switches between the first logic level and the second logic level causing a disabling of the microprocessor to thereby slow down the operation of the microprocessor.

6 Claims, 3 Drawing Figures

COMPUTER SPEED CONTROL

The present invention relates to a system for slowing down the sequential operation of a computer in a selected manner. In order to allow handicapped people to operate, for example, action games on a computer it is desired that the speed of the action of the game be slowed down. This cannot be done by merely slowing the clock speed of the computer because certain functions must take place at the originally designed operating speed. It is therefore necessary to selectively control the operating speed of the sequential events of the computer so that during the operation of certain tasks performed by the computer the speed of operation is normal but for all other tasks it is slowed down by a factor which is controlled by the operator.

Most computers employ a microprocessor which has a ready enable input. When this input has a particular logic level voltage applied thereto, the microprocessor operates at a speed determined by the clock rate $\phi$ which is generated externally of the microprocessor. When the ready enable input of the microprocessor is at the other logic level voltage, the microprocessor is disabled and no processing steps occur regardless of the existence of the clock rate $\phi$.

In the slow down mode, the present invention applies a square wave signal to the ready enable line of the microprocessor. The square wave varies in amplitude between a logic "0" and a logic "1". The duration of the square wave signal determines the degree of slow down for the computer. When, for example, the square wave is in its logic "1" state, the microprocessor is disabled. When the square wave signal is in its logic "0" state, the microprocessor is enabled and operates at its normal speed. By varying the signal duration of the square wave signal the degree of slow down is controlled.

However, as was mentioned above, there are certain special functions which when they take place must take place with the microprocessor operating at its normal speed. The circuit of the present invention detects these special functions and disables the square wave signal during these times. As a result, the enable signal applied to the microprocessor is in the correct state, during these times for normal speed operation of the microprocessor.

The special functions for which normal speed operation must be maintained are (a) the operation of control paddles for playing a game; (b) the read/write operation to and from a disk; and (c) the generation of audio signals which make up part of the environment of the game.

In accordance with an aspect of the invention there is provided a slow down circuit for use with a digital computer having a microprocessor ready line, an address bus and a data bus, said slow down circuit comprising: address decode logic means for producing an inhibit signal when predetermined bit patterns appear on said address bus, said predetermined bit patterns representing special computer functions which require the computer to operate at normal speed; slow down signal generating means connected to said address bus and said data bus for generating a bi-level signal; and combining means connected to said address decode logic means and said slow down signal generating means for combining said inhibit signal and said bi-level signal to produce a control signal; wherein, said control signal has a first and a second logic level and wherein said control signal is at said first logic level for readying said ready line in the presence of said special computer functions and alternately switches between said first logic level and said second logic level in the absence of said special computer functions, said second logic level causing a disabling of said microprocessor to thereby slow down the operation of said microprocessor.

One embodiment of the present invention includes a subroutine program, which, when called up by the keyboard of the computer, allows the operator to set the slow down rate. Once set the computer operates at that rate unless reset by either resetting the speed or by turning the computer OFF and then ON. The slower rate is determined by the duration of the square wave enable signal. The subroutine program controls a divide-by circuit which, in turn divides the clock rate by some factor to generate the square wave enable signal. The operator, by inputting the correct information on the keyboard, determines this factor.

During the normal operation of the computer, the special functions which must not be slowed down are uniquely addressed. Therefore, by studying the address lines of the computer it can be determined which bit patterns on those address lines call up the special functions. These bit patterns can then be logically processed to ultimately produce a slow down inhibit system which, in the presence of the special function, allows the computer to operate at normal speed. In the preferred embodiment, the circuit detects those special function bit patterns for an Apple II (trade mark) or Apple IIe (trade mark) computer. However, by altering the logic circuitry a special function bit pattern can be discriminated. The present invention is therefore not limited to use with an Apple II or IIe (trade mark) host computer.

The present invention will be described in detail hereinbelow with the aid of the accompanying drawings, in which.

Figure 1:
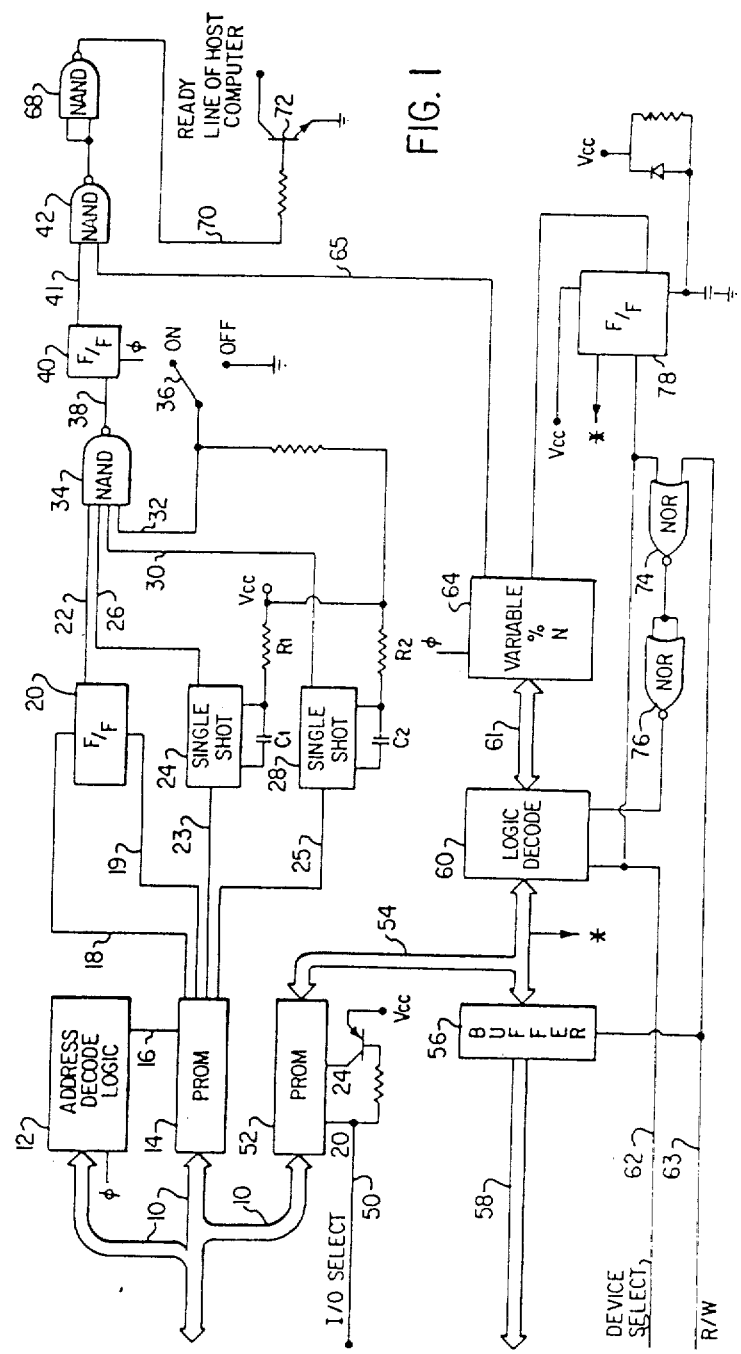
FIG. 1 is a block diagram of an embodiment of the present invention.

Referring to FIG. 1, an address bus 10 is split and feeds both address decode logic circuit (ADL) 12 and programmable read only memory (PROM) 14. In particular, as will be described later with reference to FIG. 3, address bus wires A12 to A15 are connected to ADL 12. When the host computer is an Apple II or IIe (trade mark) those special functions which must not be slowed down in the host computer have an address bus bit pattern wherein the last 4 bits are "0011". ADL 12 is designed to produce a logic "1" on output line 16 when the special function is not present. When the special function is present output line 16 has the clock rate $\phi$ impressed thereon. This clock rate enables PROM 14. When other types of host computers are used, the bit pattern may be different for those functions which are not to be slowed down. As a result, the logic circuitry of ADL 12 may change. The scope of the instant invention is not limited to the circuitry specifically used with an Apple II or IIe (trade mark) host computer.

There are many address locations which designate a special function. These addresses when they occur are decoded by PROM 14. When the PROM 14 enable signal is present on line 16 and an address bit pattern is present on bus 10 which would enable the disk drive motor, output line 18 toggles flip-flop 20 to produce a logic "0" on output line 22. Flip-flop 20 remains in that state until the motor "off" bit pattern appears on address bus 10. When that happens ADL 12 and PROM 14 produce a logic output on line 19 which resets flip-flop 20 to change the logic level on output 22 to a logic "1".

The special function for an audio output is decoded by ADL 12 and PROM 14. This action produces a trigger on line 23 which activates single shot 24. Activation of single shot 24 produces a logic "0" on line 26. The length of time that the logic "0" is sustained is determined by the time constant of resistor $R_1$ and capacitor $C_1$.

The special function for the paddle control is performed in exactly the same manner as was described for the audio single shot 24. With the paddle control single shot 28 feeds a logic "0" signal onto line 30 upon the receipt of a signal on line 25. Resistor $R_2$ and capacitor $C_2$ control the length of time the logic "0" remains on line 30. Of course, in the time that lines 26 and 30 are held at logic "0" another similar signal could be decoded which would refresh that signal.

Lines 22, 26 and 30 all form the inputs to NAND gate 34. A fourth line 32 also forms the input to NAND gate 34. A switch 36 turns "ON" and "OFF" the slow down circuit.

When no special function operation is taking place and the slow down circuit is "ON", all 4 inputs to NAND gate 34 are at logic "1" and output line 38 is at logic "0". When any one of the special functions occur or the slow down circuit is switched "OFF" one or more inputs to NAND gate 34 goes low and therefore line 38 goes high or to logic "1".

Flip-flop 40 merely synchronizes and inverts the logic transitions on line 38 so that they occur with the leading edge of the clock pulse $\phi$.

The output of flip-flop 40 forms one input of NAND gate 42 via line 41. When it is desired that the slow down mode be in effect, a logic "1" appears on line 41.

When I/O select line 50 is at a logic "0" level, PROM 52 is enabled via pin 20 and powered from $V_{cc}$ via pin 24. At this point the subroutine stored within PROM 52 is read into the host computer via data bus 54, buffer 56 and data bus 58. The program displays on the video display terminal information which will enable the operator to choose the degree of slow down. The computer can be incrementally slowed down from a factor of 1 to a factor of 64. The type of display and the program for producing the display does not form part of the invention.

The outcome of the operator choosing a particular slow down speed is that the speed reduction is placed on data bus 58 and is impressed on logic decode circuit 60 via buffer 56 and bus 54. When device select line 62 is forced into a logic "0" state, logic decode circuit 60 is activated and decodes the bit pattern on bus 54 into a 6 bit binary code. That 6 bit binary code is output on bus 61 and controls the degree of divide-by of variable divide-by circuit 64. Variable divide-by circuit 64 takes the clock pulse $\phi$ and divides it down by a factor which is input from the host computer as described above. The result is a square wave signal which is symmetrical and which has a duration which is a multiple of the clock rate. The output of the divide-by circuit 64 is fed via line 65 to the second input of NAND gate 42.

If the logic "1" portion of the square wave slow down signal is defined as PH, then when PH and the logic "1" on line 41 exist together, the output of NAND gate 42 is a logic "0" which is inverted to a logic "1" on line 70 by inverter NAND gate 68. The logic "1" on line 70 turns on transistor 72 and the enable line is grounded thereby stopping the host computer microprocessor. During the logic "0" portion PL of the square wave signal, or during any one of the special functions, the output of NAND gate 42 will be logic "1", line 70 will be logic "0" and the transistor 72 will be cut off thereby returning the ready line of the computer microprocessor to logic "1". Under this condition the microprocessor operates at normal speed.

The logic decode circuit 60 will be activated only if the R/W line 63 is activated and the device select line is activated. This combination of events is controlled by NOR gate 74 and NOR gate inverter 76 which are connected in series and then connected to the clock input of logic decode circuit 60.

The variable divide-by-N circuit is enabled only if $V_{cc}$ is stable and the logic decode circuit was selected with bit 7 of the data bus 54 at logic level "1". This precaution is controlled by flip-flop 78.

Figure 2:
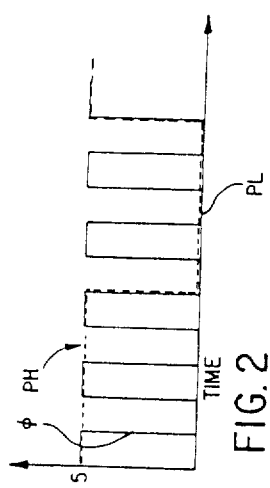
FIG. 2 is a waveform diagram which will assist in understanding the circuit of FIG. 1.

FIG. 2 shows the relationship between the clock pulses $\phi$ and the slow down square wave signal which is comprised of a logic "1" step PH and a logic "0" step PL.

Figure 3:
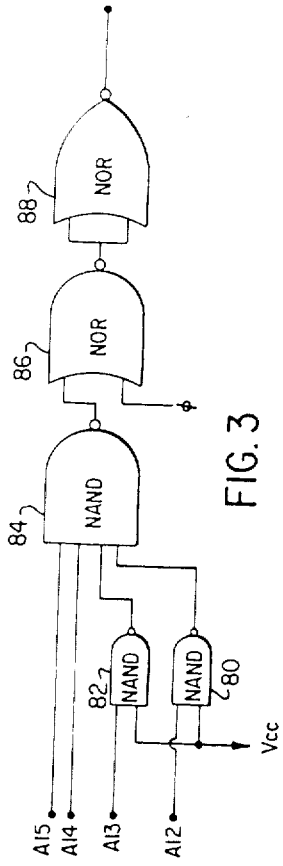
FIG. 3 is a schematic diagram of a portion of the block diagram of FIG. 1 for use in a particular application.

FIG. 3 is a detailed diagram of the address decode logic circuit 12 of FIG. 1. This particular logic circuit is for use with an Apple II or IIe (trade mark) host computer. The bit pattern appearing on the 4 address lines $A_{15}$ to $A_{12}$ for the special functions where the computer is to run at full speed is "1100". When the logic "0" appearing on line $A_{12}$ is nanded with $V_{cc}$, NAND gate 80 produces a logic "1". Similarly, NAND gate 82 produces a logic "1" when line $A_{13}$ is impressed with a logic "0". NAND gate 84 produces a logic "0" only when all 4 of its inputs are impressed with a logic "1" which can occur only when "1100" appears at address lines $A_{15}$ to $A_{12}$, respectively. NOR gate 86 and inverter 88 produce a clock output $\phi$ when and only when "1100" appear on address lines $A_{15}$ to $A_{12}$, respectively. As a result, PROM 14 is enabled only when a special function occurs. It is the activation of PROM 14 in FIG. 1 which ultimately allows the host computer to operate at its normal speed.

I claim:

1. A slow down circuit for a digital computer having a microprocessor ready line which enables said microprocessor when impressed with a first logic level voltage and disables the microprocessor when impressed with a second logic level voltage, an address bus, a data bus and a clock pulse generator for producing a clock pulse train, said slow down circuit comprising:

(a) address decode logic means connected to said address bus and said clock pulse generator for producing a clock pulse train when predetermined bit patterns appear on said address bus, said predetermined bit patterns representing special computer functions which require the computer to operate at normal speed;

(b) inhibit signal generating means connected to said address bus and said address decode logic means for producing an inhibit signal when said predetermined bit patterns appear on said address bus and in the presence of said clock pulse train from said address decode logic means;

(c) slow down signal generating means connected to said address bus and said data bus for generating a bi-level signal; and (d) combining means having input terminals connected to said inhibit signal generating means and said slow down signal generating means and an output terminal connected to said microprocessor ready line for combining said inhibit signal and said bi-level signal to produce a control signal; wherein, said control signal has said first and second logic level voltages and wherein said control signal is at said first logic level voltage for enabling said ready line in the presence of said special computer functions and alternately switches between said first logic level voltage and said second logic level voltage in the absence of said special computer functions, said second logic level voltage causing a disabling of said microprocessor to thereby slow down the operation of said microprocessor.

2. The circuit of claim 1, wherein said slow down signal generating means includes a variable divide-by-N circuit which divides said clock pulse train by N to produce said bi-level signal, where N is a positive integer.

3. The circuit of claim 2 wherein said slow down signal generating means includes a programmable read only memory (PROM) connected to said address bus and said data bus, said PROM holding a program which when run by said digital computer allows a slow down ratio to be selected by determining the value of N.

4. The circuit according to claim 3 wherein said slow down signal generating means includes logic decode means connected to said data bus and said variable divide-by-N circuit, said logic decode means receiving a signal from said digital computer on said data bus which is representative of the desired slow down ratio, and translating said signal into a control signal for determining the N of the variable divide-by-N circuit.

5. The circuit according to claim 2, 3 or 4 wherein N ranges form 1 to 64.

6. The circuit according to claim 4 wherein said PROM and said logic decode means are connected to said data bus via a buffer means.

* * * * *